US008137866B2

(12) United States Patent
Suzuki et al.

(10) Patent No.: US 8,137,866 B2
(45) Date of Patent: Mar. 20, 2012

(54) TITANIUM MATERIAL FOR FUEL CELL SEPARATOR HAVING LOW CONTACT RESISTANCE

(75) Inventors: Jun Suzuki, Kobe (JP); Toshiki Sato, Kobe (JP); Kasumi Yanagisawa, Kobe (JP); Takashi Yashiki, Osaka (JP); Masahito Fukuda, Shinagawa-ku (JP)

(73) Assignee: Kobe Steel, Ltd., Kobe-shi (JP)

( * ) Notice: Subject to any disclaimer, the term of this patent is extended or adjusted under 35 U.S.C. 154(b) by 771 days.

(21) Appl. No.: 11/995,937

(22) PCT Filed: Jul. 26, 2006

(86) PCT No.: PCT/JP2006/314770
§ 371 (c)(1),
(2), (4) Date: Jan. 17, 2008

(87) PCT Pub. No.: WO2007/013508
PCT Pub. Date: Feb. 1, 2007

(65) Prior Publication Data
US 2010/0119882 A1    May 13, 2010

(30) Foreign Application Priority Data

Jul. 28, 2005  (JP) .................................. 2005-219258
Feb. 28, 2006  (JP) .................................. 2006-053029

(51) Int. Cl.
*H01M 4/66* (2006.01)
*H01M 4/64* (2006.01)

(52) U.S. Cl. ......... 429/522; 429/517; 429/518; 429/519

(58) Field of Classification Search ........................ None
See application file for complete search history.

(56) References Cited

U.S. PATENT DOCUMENTS 3,063,835 A    11/1962 Stern
(Continued)

FOREIGN PATENT DOCUMENTS

DE    66414    4/1969
(Continued)

OTHER PUBLICATIONS

Machine translation of JP 2004-134276, Takagi et al., Apr. 30, 2004.*
(Continued)

*Primary Examiner* — Barbara Gilliam
*Assistant Examiner* — Kwang Han
(74) *Attorney, Agent, or Firm* — Oblon, Spivak, McClelland, Maier & Neustadt, L.L.P.

(57) ABSTRACT

A separator for a fuel cell comprising a titanium alloy substrate containing at least one noble metal element selected from platinum group elements, Au and Ag; and a layer of a mixture formed on the titanium alloy substrate, said mixture comprising the noble metal element precipitated from the titanium alloy substrate and titanium oxide, and said layer having an average thickness of up to 200 nm; wherein the mixture layer on the surface and the titanium alloy substrate have a conductivity in terms of contact resistance as determined by the following method of up to 12 m$\Omega \cdot$cm$^2$. The contact resistance is determined by placing a carbon cloth having an average thickness of 0.3 mm on opposite surfaces of the titanium alloy substrate having the mixture layer formed thereon; sandwiching the titanium alloy material with a pair of copper electrodes via the carbon cloth, the copper electrodes each having a contact area with the titanium alloy material of 1 cm$^2$; measuring voltage drop between the carbon cloths by using a four terminal ohmmeter while pressing the copper electrodes against the titanium alloy material at a surface pressure of 5 kg/cm$^2$ by using a hydraulic press and applying an electric current of 7.4 mA between the copper electrodes; and calculating the contact resistance from the measured value.

24 Claims, 4 Drawing Sheets

U.S. PATENT DOCUMENTS

| | | | |
|---|---|---|---|
| 3,096,272 A | 7/1963 | Beer | |
| 3,616,445 A | 10/1971 | Bianchi et al. | |
| 3,645,862 A * | 2/1972 | Cotton et al. | 205/212 |
| 5,683,828 A | 11/1997 | Spear et al. | |
| 5,858,567 A | 1/1999 | Spear, Jr. et al. | |
| 5,863,671 A | 1/1999 | Spear, Jr. et al. | |
| 6,313,064 B1 * | 11/2001 | Miyafuji et al. | 502/345 |

FOREIGN PATENT DOCUMENTS

| | | |
|---|---|---|
| DE | 2111372 | 9/1972 |
| EP | 1 511 105 A1 | 3/2005 |
| GB | 1 398 211 | 6/1975 |
| JP | 6 25779 | 2/1994 |
| JP | 06-036776 | 2/1994 |
| JP | 06-231773 | 8/1994 |
| JP | 11 162479 | 6/1999 |
| JP | 2000 248324 | 9/2000 |
| JP | 2002 75399 | 3/2002 |
| JP | 2003 105523 | 4/2003 |
| JP | 2003 105564 | 4/2003 |
| JP | 2004-134276 | 4/2004 |
| JP | 2004 158437 | 6/2004 |
| JP | 2004-247087 | 9/2004 |
| JP | 2004 273370 | 9/2004 |
| JP | 2006 19024 | 1/2006 |
| JP | 2006 190643 | 7/2006 |
| RU | 2174728 | 10/2001 |
| RU | 2237317 | 9/2004 |
| WO | WO 00/22689 | 4/2000 |

OTHER PUBLICATIONS

U.S. Appl. No. 12/709,935, filed Feb. 22, 2010, Sato et al.
U.S. Appl. No. 12/615,377, filed Nov. 10, 2009, Ito et al.

\* cited by examiner

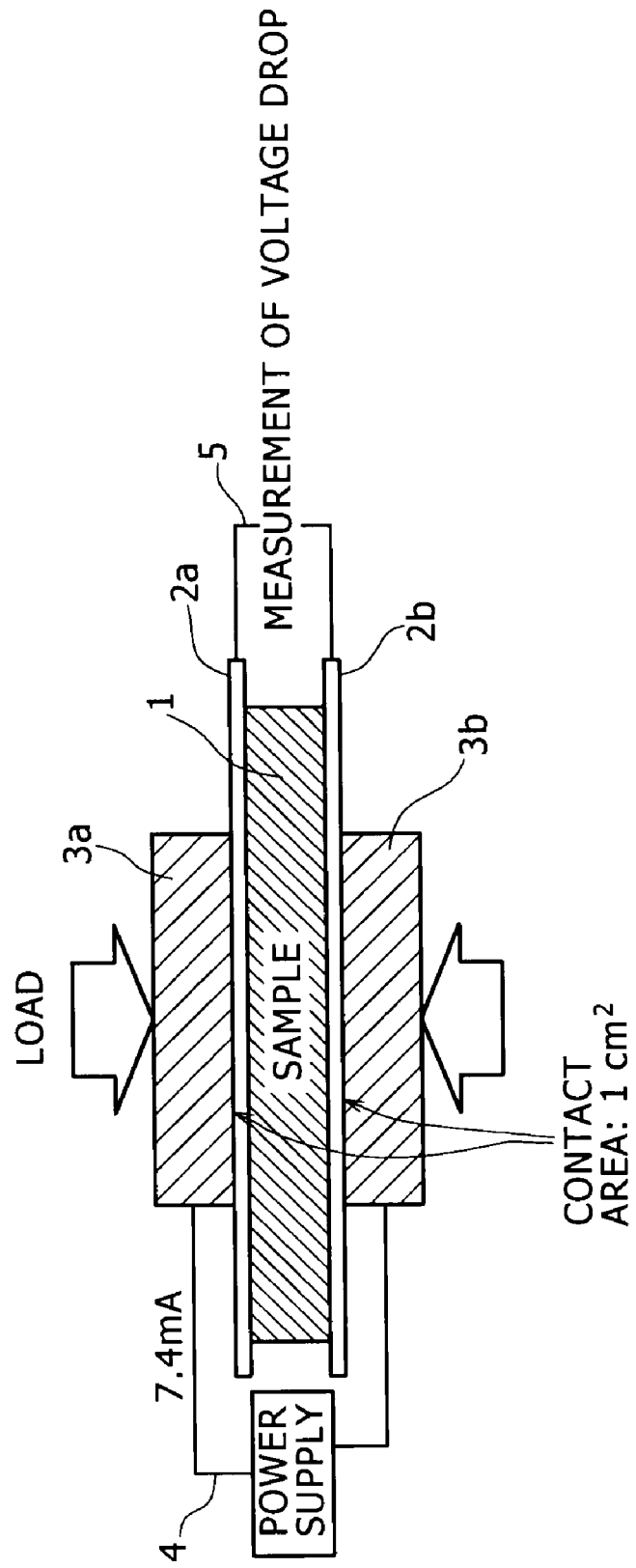

TITANIUM MATERIAL FOR FUEL CELL SEPARATOR HAVING LOW CONTACT RESISTANCE

TECHNICAL FIELD

The present invention relates to a titanium material for an electrode, and more specifically, this invention belongs to the field of producing a titanium material for an electrode adapted for use as a fuel cell separator. The titanium material for an electrode of the present invention is mainly used as a titanium plate or a titanium bar.

BACKGROUND ART

A polymer electrolyte fuel cell comprises a plurality of single cells each comprising a polymer electrolyte membrane sandwiched between an anode and a cathode. The cells are stack one on another by an intervening electrode called a separator (or a bipolar plate).

The material used for the fuel cell separator is required to exhibit a low contact resistance and this low contact resistance should be maintained for a long time during its use as a separator of the fuel cell. In view of such requirement, use of a metal material such as an aluminum alloy, a stainless steel, a nickel alloy, and a titanium alloy has been contemplated also in view of workability and strength.

However, these materials have the problem that electroconductivity is greatly reduced by the oxide film formed on its surface when it is used for a fuel cell separator. As a consequence, despite its low initial contact resistance, such low contact resistance is not maintained for a prolonged period throughout its use as the separator, and the contact resistance increases with time to invite current loss. Another problem is deterioration of the electrolyte membrane by the metal ion dissolved out of the material by corrosion.

In view of such situation, a technique has been proposed to maintain the electroconductivity by suppressing increase in the contact resistance. For example, an electroconductive ceramic film may be formed on the metal surface to thereby suppress metal corrosion and maintain electroconductivity (see Patent Document 1).

Also proposed is a product produced by removing the passive film from the metal surface, covering the surface with a noble metal, for example, by plating to thereby maintain the electroconductivity, subjecting the metal to a compression treatment after covering the metal surface with the noble metal, and treating the metal in an active gas atmosphere for corrosion protection (see Patent Document 2).

Patent Document 1: Japanese Patent Application Laid-Open No. 11-162479
Patent Document 2: Japanese Patent Application Laid-Open No. 2003-105523

DISCLOSURE OF THE INVENTION

Problems to be Solved by the Invention

The prior art techniques as described above are capable of realizing the durability required for a separator to some extent. However, they are insufficient in maintaining the electroconductivity (in maintaining the low contact resistance for a long time during its use for the separator).

For example, in the case of the Patent Document 1, cracks may be formed in the ceramic film by certain type of impact since the ceramic is brittle. Once the cracks are formed in the ceramic membrane, a corrosive substance may enter from such cracks and the substrate (metal) may become corroded. This will result in the peeling and crack formation, which may invite increase in the contact resistance, and hence, decrease in the electroconductivity.

In the case of the Patent Document 2, the product suffers from the problem of local peeling of the noble metal thin layer, and this may invite decrease in the electroconductivity. More specifically, a separator is normally provided with surface irregularities, and uniform compression treatment after the formation of the noble metal thin layer is difficult. As a consequence, cracks are easily generated in the noble metal layer, and the local residual stress in the noble metal layer may result in the local peeling of the noble metal layer, and this invites increase in the contact resistance, and hence, decrease in the electroconductivity.

The present invention has been completed in view of the situation as described above, and an object of the present invention is to provide a titanium material for an electrode which exhibits low contact resistance, and which exhibits stable electroconductivity for long time.

Means For Solving The Problems

The object as described above is realized, in summary, by the titanium material for an electrode according to the present invention which comprises a titanium alloy substrate containing at least one noble metal element selected from platinum group elements, Au and Ag; and a layer of a mixture formed on the titanium alloy substrate, said mixture comprising the noble metal element precipitated from the titanium alloy substrate and titanium oxide, and said layer having an average thickness of up to 200 nm; wherein the mixture layer on the surface and the titanium alloy substrate have a conductivity in terms of contact resistance as determined by the following method of up to 12 m$\Omega \cdot$cm$^2$.

The contact resistance is determined by placing a carbon cloth having an average thickness of 0.3 mm on opposite surfaces of the titanium alloy substrate having the mixture layer formed thereon, sandwiching the titanium alloy material with a pair of copper electrodes via the carbon cloth, said copper electrodes each having a contact area with the titanium alloy material of 1 cm$^2$, measuring voltage drop between the carbon cloths by using a four terminal ohmmeter while pressing the copper electrodes against the titanium alloy material at a surface pressure of 5 kg/cm$^2$ by using a hydraulic press and applying an electric current of 7.4 mA between the copper electrodes, and calculating the contact resistance from the measured value.

The platinum group element is at least one element selected from Pd, Pt, Ir, Ru, Rh, and Os.

Effects of the Invention

In the present invention, the surface layer (coating) on the surface of the titanium material for an electrode is provided as a layer of a mixture of the noble metal and the titanium oxide from the titanium alloy substrate. More specifically, the surface layer (coating) is provided as a mixture layer of the noble metal element (crystals or grains) precipitated from the titanium alloy substrate into which the noble metal element has been preliminarily incorporated, and the titanium oxide newly formed by heat treating the titanium alloy substrate on which the noble metal element has been precipitated.

In this regard, the surface layer of the titanium material for an electrode of the present invention is entirely different from the prior art as described above, and a film or coating comprising a material different from the titanium material, for example, an electroconductive ceramic film or a film coated by plating a noble metal is not separately provided on the surface of the titanium material (titanium alloy substrate).

This approach overcomes the problem inherent to the separate provision of the coating from different material of the prior art, namely, the problem of insufficient adhesion and peeling of the coating or film. In addition, the separate coating of the different material of the prior art also has the problem of inferior recyclability compared to the present invention where such different material is not coated, because when the prior art material after its uses as an electrode is reused as a scrap (a material to be melted for producing a titanium alloy), the different material should be separated from the substrate titanium alloy before its use as a material to be melted for producing a titanium alloy.

In addition, the layer of the mixture of the noble metal element (crystals or grains) and the titanium oxide formed from the titanium alloy substrate has excellent electroconductivity such that the contact resistance measured by the method as described above is up to 12 m$\Omega \cdot$cm$^2$ as will be described below, and at the time, such electroconductivity (electroconductive properties) is stable for a long time because of the high corrosion resistance and durability.

If the surface layer (coating) provided on the titanium material for an electrode was not the mixture layer of the noble metal element (crystals or grains) and the titanium oxide formed from the titanium alloy substrate as in the case of the present invention, the surface of the mixture layer and the titanium alloy substrate would not exhibit the excellent electroconductivity such that the contact resistance measured by the method as described above is up to 12 m$\Omega \cdot$cm$^2$, which is stably maintained for along time.

The value of the contact resistance obtained by the method as described above is the one obtained by selecting severe conditions both in terms of the method used for the measurement and the value of the contact resistance itself. Accordingly, such contact resistance is not realized even if a mixture layer was formed by using a noble metal element separately coated on the surface of the titanium alloy substrate (and not by using the noble metal element precipitated from the titanium alloy substrate) and formed into a layer of a mixture of the noble metal element with the titanium oxide. In such a case, the mixture layer would be the one separately coated as in the case of prior art products, and even if initial electroconductivity could be realized, the product will suffer from significant loss of the electroconductivity due to the problem of the insufficient adhesion and peeling inherent to the prior art product as described above during its use as a fuel cell separator.

In addition, even if the surface layer (coating) provided on the surface of the titanium material for an electrode was a mixture layer of the noble metal element from the titanium alloy substrate and the titanium oxide as in the case of the present invention, there can of course be some cases in which the mixture has been produced under unfavorable or non-optimal conditions. In such a case, the surface of the mixture layer and the titanium alloy substrate may not exhibit the excellent electroconductivity such that the contact resistance measured by the method as described above is up to 12 m$\Omega \cdot$cm$^2$, which is stably maintained for a long time.

In addition, as will be described below, it is difficult to quantitatively analyze or determine acceptability of the mixture layer of the noble metal and the titanium oxide formed from the titanium alloy substrate (whether the mixture layer satisfies the properties required for a fuel cell separator and the like) by the porosity of the mixture layer or thickness or continuity of the titanium oxide layer because of the extreme thinness of the mixture layer. Quantitative analysis and determination of the acceptability of the mixture layer by metallurgical means are also very difficult because such acceptability is not determined by the compositional or histological difference.

Therefore, the contact resistance determined by the measurement procedure used in the present invention is not mere definition of the properties. In other words, the contact resistance in the present invention is an important criteria or evaluation standard which can substitute or which is equivalent to the determination by the composition of the mixture layer or the metallurgical quantitative analysis or determination.

The present invention as described above is capable of providing a titanium material for an electrode which has a low contact resistance and a high electroconductivity realized by such low contact resistance which is stable for a long time.

BRIEF DESCRIPTION OF THE DRAWING

FIG. 4 is a schematic drawing presented for explaining the apparatus used for measuring the contact resistance.

BEST MODE FOR CARRYING OUT THE INVENTION

Figure 1:
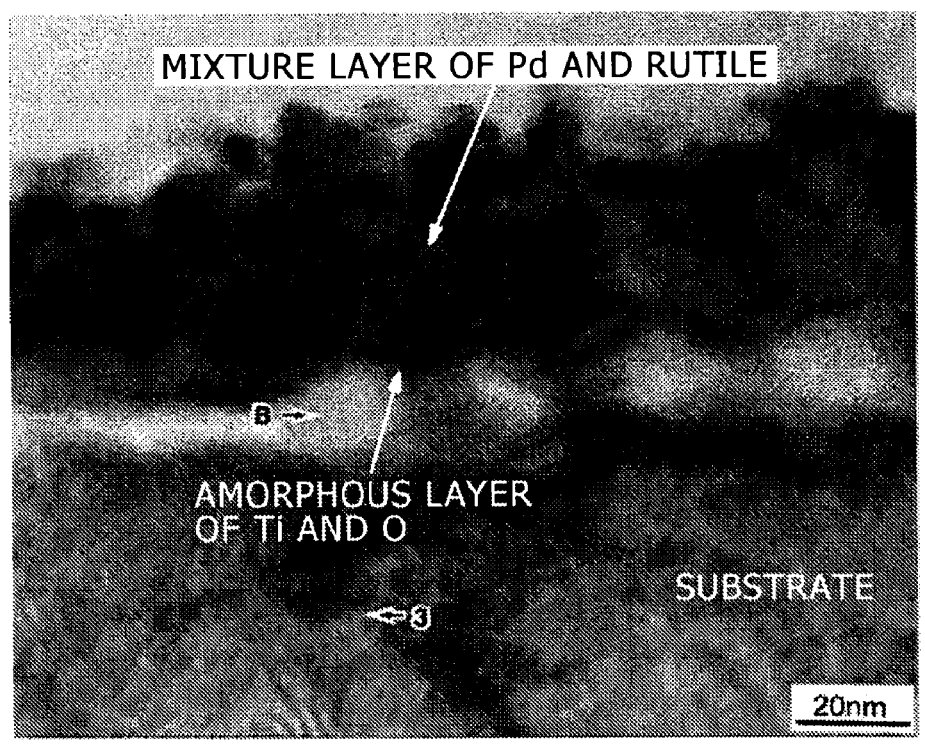
FIG. 1 is a photograph which is a substitute for a drawing, and shows a mixed layer of an Inventive Example comprising a noble metal element and the titanium oxide formed on the surface of the titanium material for an electrode.

Next, the present invention is described in detail.
(Titanium Alloy Substrate)

The titanium alloy substrate used in the present invention can be produced in any desired shape such as plate or slab. In order to precipitate the noble metal element from the titanium alloy substrate on the surface of the titanium alloy substrate, and form a mixture layer of this precipitated noble metal and the titanium oxide, the titanium alloy substrate should contain at least one alloying element which is at least one noble metal element selected from platinum group elements (Pd, Pt, Ir, Ru, Rh, and Os), Au (gold), and Ag (silver).

The titanium alloy substrate which is the matrix for incorporating such noble metal element may be adequately selected from general purpose pure titanium and general purpose titanium alloy which satisfy the mechanical properties required for a fuel cell separator or the like. Exemplary titanium alloys (content of the alloying element indicated in % by weight) include:

Ti-0.4 Ni-0.015 Pd-0.025 Ru-0.1 4Cr (JIS Type 14, Type 15), Ti-0.05 Pd (JIS Type 17, Type 18), Ti-0.05 Pd-0.3 Co (JIS Type 19, Type 20), Ti-0.05 Ru-0.5 Ni (JIS Type 21, Type 22, Type 23), and Ti-0.1 Ru.

The titanium alloy used for the substrate may optionally include elements such as 0, H, N, Fe, and C in order to control mechanical properties such as tensile strength. The surface condition of the substrate titanium alloy is not particularly limited, and exemplary surface conditions include pickled surface, bright annealing, and polish finishing generally used in the art.

(Content of the Noble Metal Element)

The noble metal element in the titanium alloy substrate will precipitate and concentrate to the surface of the substrate to form an electroconductive layer as a result of the selective corrosion and dissolution of the Ti in the precipitation treatment by an acid solution as will be described below. Even if the content of the noble metal element were very minute, required amount of the noble metal element for precipitation will be secured and an electroconductive layer effective for reducing the contact resistance will be formed when amount of the Ti dissolution in the precipitation treatment is increased.

However, when the content of the noble metal element in the titanium alloy substrate is too low, cost of the Ti that has to be dissolved will increase, and also, a prolonged time will be required for the precipitation of the noble metal element. In addition, when the conditions used for the mixture layer formation including the precipitation of the noble metal element is unfavorable, there is a considerable risk that the mixture layer of the noble metal element and the titanium oxide can not be formed by the precipitation of the noble metal element on the titanium alloy substrate. Furthermore, even if the mixture layer could be formed, the resulting mixture layer may not exhibit the excellent electroconductivity such that the surface of the mixture layer and the titanium alloy substrate exhibits the contact resistance as measured by the procedure as described above of up to 12 $m\Omega \cdot cm^2$, which is stably maintained at such level for a long period.

On the other hand, an excessive incorporation of the noble metal element will invite increase in the price and incapability of economical production of the titanium material for an electrode. In addition, the resulting titanium material for an electrode may suffer from inferior mechanical properties as well as insufficient workability. Furthermore, as described above, incorporation of a large amount of the noble metal element is not necessary for the formation of the mixture layer.

In view of the situation as described above, content of the noble metal element in the titanium alloy substrate is preferably in the range of 0.005 to 1.0% by weight, more preferably 0.01 to 0.5% by weight, and most preferably 0.03 to 0.3% by weight in total content of the noble metal element.

(Layer Comprising a Mixture of the Noble Metal Element and the Titanium Oxide)

Next, the mixture layer of the noble metal element (crystals or grains) and the titanium oxide formed on the surface of the titanium material for an electrode in the present invention is described.

(Thin Layer)

The mixture layer of the noble metal element (crystals or grains) and the titanium oxide in the present invention is a thin layer having an average thickness of up to 200 nm formed from the titanium alloy substrate. The layers formed in the prior art as described above have been the layers formed on the surface of the titanium material from a material which is different from the one present in the titanium material with the thickness in the order of either mm or μm, and in view of such layer thickness, the mixture layer of the noble metal element (crystals or grains) and the titanium oxide of the present invention has unique feature.

(Contact Resistance)

The mixture layer of the noble metal and the titanium oxide in the present invention has a characteristic feature that the surface of the mixture layer and the titanium alloy substrate have an electroconductivity in terms of the contact resistance as measured by the procedure as described below of up to 12 $m\Omega \cdot cm^2$, and more preferably (more strictly), up to 9 $m\Omega \cdot cm^2$. The carbon material that has been used in the development of the separator material has a contact resistance as measured by the following method of about 15 $m\Omega \cdot cm^2$. In view of such situation, the separator material of the present invention has a superior contact resistance of up to 12 $m\Omega \cdot cm^2$. When the contact resistance is too high, an excessive current is lost during the use, and use of such titanium material for an electrode as the separator will be inadequate.

The property of the contact resistance as described above is realized by preliminarily incorporating the content of the mixture layer in the titanium alloy substrate and forming the mixture layer from the noble metal element precipitated from the titanium alloy substrate and the titanium oxide formed by heat treating such titanium alloy substrate having the noble metal element precipitated to the surface. The mixture layer of the noble metal and the titanium oxide formed from the titanium alloy substrate exhibits excellent electroconductivity, and since the mixture layer has excellent corrosion resistance and durability, such high electroconductivity is stable for a prolonged time.

Figure 2:
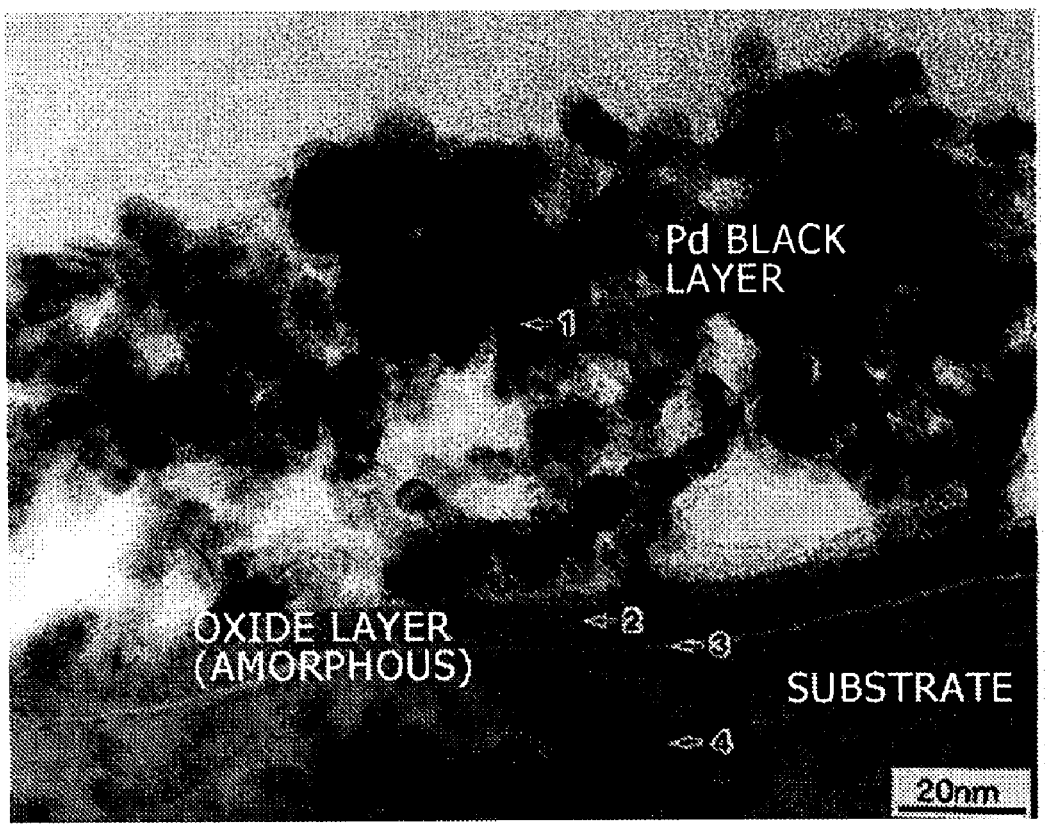
FIG. 2 is a photograph which is a substitute for a drawing, and shows a mixed layer of a Comparative Example comprising a noble metal element and the titanium oxide formed on the surface of the titanium material for an electrode.
Figure 3:
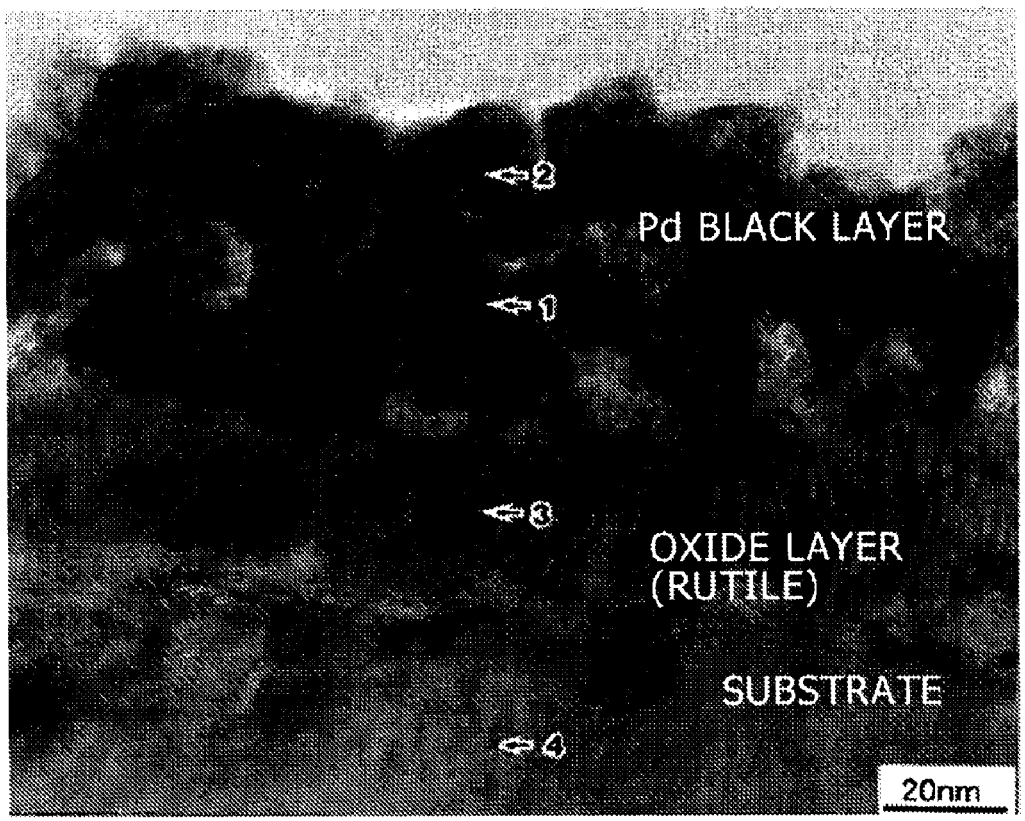
FIG. 3 is a photograph which is a substitute for a drawing, and shows a mixed layer of a Comparative Example comprising a noble metal element and the titanium oxide formed on the surface of the titanium material for an electrode.

FIGS. 1 to 3 are photographs taken by TEM at a magnification of 750,000 showing the cross sectional texture of the mixture layer of the noble metal and the titanium oxide formed on the surface of the titanium material for an electrode. FIG. 1 corresponds to the mixture layer of the noble metal element (crystals or grains) and the titanium oxide formed on the surface of the titanium material for an electrode according to the present invention. The example of the present invention shown in FIG. 1 corresponds to Inventive Example 4 which will be described in the section of Examples, and the mixture layer shown in FIG. 1 is the one formed under the preferable conditions (production method) as will be described below.

In contrast, FIG. 2 shows the mixture layer of the noble metal element (crystals or grains) and the titanium oxide for comparative purpose. This mixture layer was produced by precipitating the noble metal element under the preferable conditions as will be described below as in the case of FIG. 1, but without conducting the heat treatment. FIG. 2 corresponds to Comparative Example 2 which will be described in the section of Examples.

In contrast, FIG. 3 shows the mixture layer of the noble metal element (crystals or grains) and the titanium oxide for comparative purpose. This mixture layer was produced by precipitating the noble metal element under the preferable conditions as will be described below as in the case of FIG. 1, but conducting the heat treatment under an atmospheric atmosphere containing a substantial amount of oxygen. FIG. 3 corresponds to Comparative Example 3 which will be described in the section of Examples.

As demonstrate in FIGS. 1 to 3, the mixture layer is formed by a mixture of the precipitated noble metal element (crystals or grains) and the titanium oxide grains.

The compact texture of the mixture layer of FIG. 1 prevents corrosion of the titanium alloy substrate since the titanium oxide grains act as the barrier for diffusion of the corrosive substances from the environment. Accordingly, the mixture layer exhibits corrosion resistance and durability to stably maintaining the electroconductivity (electroconductive properties) for a long time.

In contrast, the mixture layer of FIG. 2 is a coarse layer with a large amount of pores (gaps), and the titanium oxide layer of the mixture layer on the side of the titanium substrate is thick and continuous. The mixture layer of FIG. 3 may be compact, but the titanium oxide layer of the mixture layer on the side of the titanium substrate is thicker and continuous.

The contact resistance of the mixture layer measured by the method as described above is 6 mΩ·cm² for the mixture layer of the present invention as shown in FIG. 1; 37 mΩ·cm² for the mixture layer of the Comparative Example as shown in FIG. 2; and 402 mΩ·cm² for the mixture layer of the Comparative Example as shown in FIG. 3. As demonstrated by this result, there is a clear difference in the contact resistance. When the mixture layer is coarse with a large amount of pores (gaps), or the titanium oxide layer of the mixture layer on the side of the titanium substrate is thick and continuous as in the case of FIGS. 2 and 3, the contact resistance is inevitably not up to 12 mΩ·cm².

When the mixture layer is coarse with a large amount of pores (gaps) as in the case of the mixture layer of FIG. 2, corrosive reagents such chloride ion and sulfide ion invades the mixture layer in the environment where they corrode the substrate titanium alloy. When the substrate titanium alloy is corroded, the corrosion product intrudes the mixture layer to corrode the substrate titanium alloy. When the substrate titanium alloy is corroded, the corrosion products cause volume expansion of the substrate, an this results in the peeling of the concentrated layer. The electric resistance of the corrosion product also results in the increase of the contact resistance, and hence, loss of electroconductivity.

When the mixture layer of FIG. 1 according to the present invention is compared with the mixture layers of FIGS. 2 and 3 presented for the purpose of comparison, qualitative difference such as whether the layer has a large amount of pores (gaps) or the layer is compact, and whether the titanium oxide layer of the mixture layer on the side of the titanium substrate is thick and continuous or thin and discontinuous should be readily conceivable. However, quantitative representation of such difference in the mixture layer by the porosity or thickness or continuity of the layer is very difficult because of the extreme thinness of the mixture layer. In addition, these mixture layers are substantially the same for their composition and texture, and metallurgical differentiation is also very difficult.

Therefore, the contact resistance determined by the measurement procedure as described above used in the present invention is not mere definition of the properties. In other words, the contact resistance in the present invention is an important criteria or evaluation standard for determining whether the mixture layer satisfies the properties required for a fuel cell separator, and this contact resistance can substitute or this contact resistance is equivalent to the determination by the composition of the mixture layer or the quantitative analysis or determination by the metallurgical means.

(Measurement of Contact Resistance)

FIG. 4 shows an embodiment of the apparatus used for measuring the contact resistance. In FIG. 4, 1 stands for the titanium alloy material in the form of a plate, 2 designates for carbon cloth, and 3 designates for copper electrode. More specifically, the plate-shaped titanium alloy material 1 having a mixture layer formed thereon is sandwiched between the carbon cloth 2a and 2b each having an average thickness of 0.3 mm, and further sandwiched from the upper side of the titanium alloy material 1 by a copper electrode 3a having a contact area with the titanium alloy material 1 of 1 cm² and from the lower side of the titanium alloy material 1 by a copper electrode 3a having a contact area with the titanium alloy material 1 of 1 cm². A surface pressure of 5 kg/cm² is applied by a hydraulic press (not shown) to the upper and lower surfaces of the titanium alloy material 1 by the intervening copper electrodes 3a and 3b and the carbon cloths 2a and 2b. In this condition, a current of 7.4 mA is applied as shown in FIG. 4 between the copper electrodes 3a and 3b by a current line 4, and the voltage drop between the carbon cloths 2a and 2b is measured by a voltage line 5 using a four terminal ohmmeter.

In this four terminal ohmmeter, the current line 4 and the voltage line 5 are separately provided, and there fore, the resistance of the lines does not result in the error to enable a relatively accurate measurement of the contact resistance.

The contact resistance measured by this method is measured by selecting strict conditions that contemplates practical use of the product as a separator, including use of the carbon cloth and the surface pressure as described above. The value of the contact resistance has also been selected in consideration of use under strict conditions.

As a matter of course, different measurement conditions result in the different value of the contact resistance. The contact resistance does not substantially change in the range of thickness generally used for the normal titanium alloy plate for electrode, namely, in the thickness range of the titanium alloy material 1 of 0.3 to 3.0 mm. However, increase in the surface pressure applied by the hydraulic press results in the decrease of contact resistance, and the measurement of the contact resistance under such condition will be too tolerant for use of the product as a separator, and the product evaluated under such conditions may prove inadequate in its practical use as a separator. The situation will be similar when a gold plating is provided on the contact surface of the measurement electrode, or when the use of the carbon cloths is omitted.

(Thickness of the Mixture Layer)

As described above, the mixture layer of the noble metal element (crystals or grains) and the titanium oxide in the present invention is the thin layer having an average thickness of up to 200 nm formed from the titanium alloy substrate. When a mixture layer is formed by the noble metal element (crystals or grains) and the titanium oxide from the titanium alloy substrate, formation of a layer having an average thickness in excess of 200 nm is difficult, and there is also no need for forming such thick layer. The average thickness of up to 200 nm which is defined in the present invention is the limitation included for discriminating the present invention from the conventional thick films and covers having the thickness in the order of mm or μm formed by coating a different type of material on the surface of the titanium material.

However, there is preferable range for the thickness of the mixture layer of the noble metal element (crystals or grains) and the titanium oxide of the present invention, and the mixture layer may preferably have a thickness of 10 to 100 nm. When the mixture layer has an insufficient average thickness, the resulting product suffers loss of corrosion resistance and durability in short time. On the other hand, when the mixture layer has excessive average thickness, the oxide layer will be thick and the Pd will not be able to penetrate between the outermost surface and the substrate, and the contact resistance may not be in the range of up to 12 mΩ·cm². Also, the stress in the layer will increase, and the mixture layer is more likely to experience peeling and cracks, and this will invite loss of the corrosion resistance and the durability.

The average thickness of the mixture layer may be obtained by observing and measuring arbitrarily selected 10 points in the central part of the titanium material at their surface region using a TEM at a magnification of 75000 as shown in FIG. 1 and calculating the average.

(Content of the Noble Metal Element in the Mixture Layer)

Average total content of the noble metal element in the mixture layer of the noble metal and the titanium oxide is preferably 1 to 90 atomic %. When the content of the noble metal element in the mixture layer is too low, the mixture layer may not exhibit a contact resistance of up to 12 mΩ·cm².

On the other hand, incorporation of the noble metal element at an excessive amount is not required to realize the contact resistance of up to 12 m$\Omega \cdot$cm$^2$ of the mixture layer.

The content of the noble metal element in the mixture layer may be obtained, for example, by measuring arbitrarily selected 10 points in the central part of the titanium material at their surface region (the layer where the noble metal element has concentrated) by means of X-ray photoelectron spectroscopy (XPS) and calculating the average. Concentration of the Ti and the noble metal element is measured in the depth direction to obtain the concentration profile. In this concentration profile, the concentration of the noble metal element and the Ti at the depth corresponding to the peak in the noble metal element concentration is read, and the ratio, namely, $100 \times B1/(A+B1)$ is defined to be the concentration of the noble metal element in the concentrated layer. When the concentration of the noble metal element does not show the peak, the ratio of the noble metal element concentration to the Ti concentration at the outermost surface is used as the noble metal element concentration.

The concentration of the noble metal element in the noble metal element concentrated layer is the ratio of the (total) amount of the noble metal element(s) to the total of the Ti amount and the (total) amount of the noble metal element(s) in the noble metal element concentrated layer. More specifically, when the Ti amount in the noble metal element concentrated layer is "A" and the (total) amount of the noble metal element(s) is "B", the concentration of the noble metal element (s) in the noble metal element concentrated layer (atomic %) is $100 \times B/(A+B)$. When two or more noble metal elements are included and their amounts are $B_1$ and $B_2$, respectively, $B=B_1+B_2$, and the concentration of the noble metal elements in the noble metal element concentrated layer (atomic %) is $100 \times (B_1+B_2)/(A+B_1+B_2)$. When three noble metal elements are included and their amounts are $B_1$, $B_2$, and $B_3$ respectively, $B=B_1+B_2+B_3$, and the concentration of the noble metal elements in the noble metal element concentrated layer (atomic %) is $100 \times (B_1+B_2+B_3)/(A+B_1+B_2+B_3)$.

(Formation of the Mixture Layer)

In the present invention, the layer of the mixture of the noble metal and the titanium oxide is produced by, first, precipitating the noble metal element from the titanium alloy substrate to the surface of the titanium alloy substrate, and then newly generating titanium oxide on the surface of the titanium alloy substrate having the noble metal element precipitated to its surface.

This method for producing the mixture layer is capable of providing a titanium material for an electrode which has a low initial contact resistance and an excellent durability due to the high corrosion resistance, and wherein the high electroconductivity is maintained for a long time with reduced risk of experiencing increase in the contact resistance. In other words, this method is capable of providing a titanium material for an electrode wherein high electroconductivity is maintained for a long time with reduced risk of experiencing drop in the electroconductivity by the increase in the contact resistance.

(Treatment with an Acid Solution)

The precipitation of the noble metal element from the titanium alloy substrate to the surface of the substrate is accomplished by treating the substrate surface with an acid solution containing an acid which oxidizes the titanium alloy substrate (hereinafter referred to as the oxidizing acid) and an acid which does not oxidizes the titanium alloy substrate (hereinafter referred to as the non-oxidizing acid).

When the titanium alloy substrate is immersed in an acid containing the non-oxidizing acid, an extremely small amount of noble metal element dissolves in the solution. When this solution contains the non-oxidizing acid simultaneously with the oxidizing acid, re-precipitation (concentration) of the extremely small amount of the noble metal which had dissolved in the solution onto the surface of the titanium alloy substrate is promoted, and a precipitated layer having a sufficiently high concentration of the noble element (noble element-rich layer) is easily formed.

The oxidizing acid is an acid which has the characteristic feature of forming an oxide film on the surface of the titanium alloy substrate when the titanium alloy substrate is immersed in the acid solution containing such oxidizing acid. The non-oxidizing acid is an acid which does not have such characteristic feature of forming an oxide film on the surface of the titanium alloy substrate when the titanium alloy substrate is immersed in such acid solution.

The solution containing a non-oxidizing acid may be the one prepared by adding and mixing a non-oxidizing acid with a solvent such as water, or the one prepared by adding and dissolving a salt (for example, ferric chloride) which becomes a non-oxidizing acid when dissolved in a solvent to a solvent such as water. Either of these solution may be used as a solution containing a non-oxidizing acid. The solution containing an oxidizing acid may be the one prepared by adding and mixing an oxidizing acid with a solvent such as water, or the one prepared by adding and dissolving a salt which becomes an oxidizing acid when dissolved in a solvent to a solvent such as water for dissolution. Either of these solution may be used as a solution containing an oxidizing acid. The solution is not limited to an aqueous solution, and alternatively, the solution may be a non-aqueous solution prepared by dissolving an acid in an organic solvent or the like.

An exemplary oxidizing acid is nitric acid. When the solution contains the nitric acid at 0.1 to 40% by weight, re-precipitation of the noble metal element is ensured to a greater extent, and precipitation (concentration) of the noble metal element at the surface is reliably promoted. When the concentration of the nitric acid is less than 0.1% by weight, the effect of promoting the surface concentration becomes less eminent. When the concentration is in excess of 40% by weight, Ti is inactivated, and selective dissolution of the Ti at a sufficient amount becomes difficult, and hence, formation of the layer by precipitation (concentration) also becomes difficult. Accordingly, concentration of the nitric acid is preferably in the range of 0.1 to 40% by weight, and more preferably 1 to 30%. In view of the adhesion of the layer formed by the precipitation (concentration) of the noble metal element, nitric acid is preferably used at a concentration of 1 to 20% by weight.

Exemplary preferable non-oxidizing acids include hydrogen fluoride (HF), hydrochloric acid (HCl), sulfuric acid ($H_2SO_4$), phosphoric acid ($H_3PO_3$), formic acid (HCOOH), and oxalic acid [$(COOH)_2$].

When the acid content is within such range, reliable formation of the precipitation (concentration) layer having a sufficiently high concentration of the noble metal is enabled. When the concentration of such acid is low, for example, when the hydrochloric acid concentration is less than 1.0% by weight, the speed of the selective Ti dissolution becomes extremely low. This results in the difficulty of forming the precipitation (concentration) layer having a sufficiently high concentration of the noble metal within a practically acceptable time.

On the other hand, when the solution has high acid concentration, the speed of the selective Ti dissolution is extremely high. As a consequence, the layer formed by concentration of the noble metal element is instantaneously collapsed, and formation of the effective precipitation (concentration) layer is difficult. In such case, even if the noble metal element precipitation (concentration) layer was formed, the adhesion of such layer becomes insufficient.

Accordingly, the concentration of the non-oxidizing acid is, in the case of hydrogen fluoride (HF), 0.01 to 3.0% by weight, and preferably 0.05 to 2.0% by weight; in the case of hydrochloric acid (HCl), 1.0 to 30% by weight, and preferably 2.0 to 25% by weight; in the case of sulfuric acid ($H_2SO_4$), 1.0 to 30% by weight, and preferably 2.0 to 25% by weight; in the case of phosphoric acid ($H_3PO_3$), 10 to 50% by weight, and preferably 15 to 45% by weight; in the case of formic acid (HCOOH), 10 to 40% by weight, and preferably 15 to 35% by weight; and in the case of oxalic acid [$(COOH)_2$], 10 to 30% by weight, and preferably 15 to 25% by weight.

The acid as described above may be used in combination of two or more. When two or more acids are used in combination, their concentration may be selected so that the precipitation (concentration) layer of the noble metal element once formed would not collapse due to the excessive high speed of the selective Ti dissolution.

In the step of immersing the titanium alloy in an acid solution containing a non-oxidizing acid and an oxidizing acid, the reaction will proceed at a low speed when the treatment temperature (temperature of the solution) is too low. A longer time will then be required for the formation of the precipitation (concentration) layer of the noble metal element, while an excessively high temperature will result in an inconsistent dissolution, and hence, some parts of the layer where precipitation (concentration) of the noble metal element is insufficient. Accordingly, the treatment temperature is preferably 10 to 80° C., and more preferably 15 to 60° C.

When the treatment time is too short, formation of the precipitation (concentration) layer of the noble metal element will be insufficient, and durability and stability will be reduced. On the other hand, when the treatment time is considerably long, stable surface layer will be formed by the precipitation (concentration) of the noble metal element and further progress of the reaction becomes difficult, and the effect will then be saturated. Accordingly, the treatment time is generally in the range of 1 to 60 minutes although the time may differ by the composition of the solution used for the immersion of the titanium alloy and the processing temperature.

(Heat Treatment)

As described above, formation of the titanium oxide on the titanium alloy substrate after the precipitation of the noble metal element is preferably conducted at a heat treatment in an atmosphere of low oxygen concentration at an oxygen partial pressure of up to $10^{-2}$ Torr, and at a temperature in the range of 350 to 800° C. The atmosphere used is not particularly limited as long as it has low oxygen concentration. However, the atmosphere is preferably vacuum, inert gas (Ar, $N_2$ etc.), or a reducing atmosphere in view of the significant effect of the oxygen concentration as will be described below.

When the titanium alloy substrate after the precipitation of the noble metal element is heated in the atmosphere at a low oxygen concentration, a mixture layer having a contact resistance of up to 12 m$\Omega \cdot cm^2$ can be formed as shown in FIG. 1. The resulting mixture layer is also compact with reduced pores (gaps), and the titanium oxide film on the side of the titanium substrate is discontinuous.

Presumably, in the course of the heating conducted in an atmosphere at a low oxygen concentration, such formation is enabled through the determination of the reaction rate by the oxygen on the surface of the oxide and titanium in the matrix (that is, inward diffusion of the oxygen in the titanium oxide is suppressed). As a consequence, the titanium diffuses outward (toward the surface), and minute titanium oxide grains are formed between the noble metal element (crystals or grains) that had been precipitated, and this results in the compaction as well as difficulty in the development of the titanium oxide film on the side of the titanium substrate.

In contrast, when the atmosphere has a high oxygen partial pressure in excess of $10^{-2}$ Torr or a high temperature in excess of 800° C., inward diffusion (diffusion toward the matrix) of the oxygen in the titanium oxide is the rate determining factor. As a consequence, growth of the titanium oxide increases, and the resulting titanium oxide film on the side of the titanium substrate becomes thick and continuous. This results in the mixture layer, for example, as shown in FIG. 3 with an increased film contact resistance.

When this heating is conducted at a temperature of less than 350° C., the resulting product will be similar to the one produced without conducting such heat treatment, and the resulting mixture layer will be coarse with an abundant pores as shown in FIG. 2.

Next, the present invention is described in detail by referring to the Examples which by no means limit the present invention. The present invention may be worked by adequately modifying the invention to the extent not deviating the scope of the present invention, and such modifications are within the technical scope of the invention.

EXAMPLE 1

On the surface of various titanium alloy plates each containing a noble metal element as shown in Table 1, a mixture layer of the noble metal and the titanium oxide was formed. The resulting titanium alloy plates were evaluated for their contact resistance to evaluate their performance as a titanium material for an electrode.

More specifically, a titanium alloy plate containing a noble metal element having a size of 30 mm (width)×30 mm (length)×1.0 mm (thickness) was pre-treated by dry polishing to SiC #400, and ultrasonication in acetone. The plate was then immersed in an aqueous acid solution containing 10% by weight of nitric acid as the oxidizing acid and 0.25% by weight of hydrogen fluoride as a non-oxidizing acid. The aqueous solution was adjusted to a temperature of 25° C., and the plate was immersed for 10 minutes. Next, the titanium alloy plate having the noble metal element precipitated to the surface by the immersion of the plate in an aqueous acid solution was heated in vacuum having an oxygen partial pressure of up to $10^5$ Torr at 500° C. for 30 minutes to thereby form a mixture layer of the titanium oxide and the noble metal element on the titanium alloy plate, and this plate was used for the test sample.

Next, Comparative Examples were conducted by repeating the procedure as described above except that the titanium alloy plate after the immersion in the aqueous solution as described above was not subjected to the heat treatment under vacuum; or by repeating the procedure as described above except that the heat treatment was conducted in atmosphere at 500° C. for 30 minutes.

These test samples were evaluated for their contact resistance by the procedure as described above using a four terminal ohmmeter "MODEL3566" manufactured by Tsuruga Electric. The mixture layer was evaluated for the durability by simulating the use as a fuel cell separator, that is, by immersing the plate in an aqueous sulfuric acid at a temperature of 80° C. and a pH of 2 for 3000 hours (corrosion test) and thereafter measuring the contact resistance, and comparing the results before and after the corrosion test for evaluation of the durability.

The mixture layer of the noble metal element (crystals or grains) and the titanium oxide was analyzed for its structure by using the transmission electron microscope (TEM), and the structure was evaluated by its resemblance with the mixture layer structures of FIGS. 1 to 3.

The mixture layer of the noble metal element and the titanium oxide was also evaluated for its thickness and content of the noble metal element by the procedure as described above. The results are shown in Table 1.

As shown in Table 1, in the Examples of the present invention including Inventive Example 4, the noble metal element has been precipitated to the surface of the titanium alloy plate by the immersion in the preferable aqueous acid solution as described above, and the layer of the mixture of the noble metal element and the titanium oxide of the type the same as the one formed in Inventive Example 4 as shown in FIG. 1 was formed on the surface of the titanium alloy plate by the preferable heat treatment in vacuum as described above.

As a consequence, in the Inventive Examples, the surface of the mixture layer and the titanium alloy substrate had an electroconductivity as measured by the contact resistance of up to 9 mΩ·cm² when measured by the procedure as described above. In addition, the electroconductivity after the corrosion test as measured by the contact resistance was also up to 9 mΩ·cm² when measured by the procedure as described above.

Accordingly, the materials of the Inventive Examples can be deemed a material having extremely high resistance properties in view of the low contact resistance, and the low value which is maintained even after the corrosion test.

In contrast, the materials of the Comparative Examples in which the titanium alloy substrate was only immersed in the acid solution without conducting the heat treatment had a layer of the mixture of the noble metal element and the titanium oxide which was the same type as the one formed in the Comparative Example 2 shown in FIG. 2 on the surface of the titanium alloy substrate.

In the case of the materials of the Comparative Examples in which the titanium alloy substrate was immersed in the acid solution and the heat treatment was conducted not in the vacuum but in atmospheric atmosphere having a high oxygen concentration had a layer of the mixture of the noble metal element and the titanium oxide which was the same type as the one formed in the Comparative Example 3 shown in FIG. 3 on the surface of the titanium alloy substrate.

As a consequence, all of the Comparative Examples had a contact resistance of the surface of the mixture layer and the titanium alloy substrate in excess of 12 mΩ·cm². The contact resistance was even higher after the corrosion test in all Comparative Examples.

Accordingly, all of the Comparative Examples had significantly inferior contact resistance properties as demonstrated by the high contact resistance as well as the increased contact resistance after the corrosion test. This is the same for the Comparative Example 1 which was produced without conducting the immersion in the acid solution or the heat treatment and which had no mixture layer on the surface of the titanium alloy plate.

TABLE 1

| | | | Formation of the mixture layer | | Mixture layer | | | Contact resistance | |
| | | | | | | Average content of the | | | |
| Category | Abbreviation | Titanium alloy substrate | Acid solution treatment | Hot atmosphere treatment | Structure | noble metal element (atomic %) | Average thickness (nm) | Before the corrosion resistance | After the corrosion resistance |
|---|---|---|---|---|---|---|---|---|---|
| Comparative Example | 1 | Ti—0.15 Pd | — | — | — | 0.1 | 0 | 85 | 400 |
| Comparative Example | 2 | Ti—0.15 Pd | ○ | — | FIG. 2 | 50.2 | 86 | 37 | 40 |
| Comparative Example | 3 | Ti—0.15 Pd | ○ | Heating in air | FIG. 3 | 45.3 | 80 | 402 | 420 |
| Inventive Example | 4 | Ti—0.15 Pd | ○ | Heating in vacuum | FIG. 1 | 18.5 | 68 | 6 | 6 |
| Comparative Example | 5 | Ti—0.15 Ru | ○ | — | FIG. 2 | 45.3 | 110 | 33 | 40 |
| Comparative Example | 6 | Ti—0.15 Ru | ○ | Heating in air | FIG. 3 | 51.3 | 105 | 415 | 450 |
| Inventive Example | 7 | Ti—0.15 Ru | ○ | Heating in vacuum | FIG. 1 | 20.5 | 82 | 7 | 8 |
| Comparative Example | 8 | Ti—0.15 Pt | ○ | — | FIG. 2 | 52.1 | 78 | 25 | 30 |
| Inventive Example | 9 | Ti—0.15 Pt | ○ | Heating in vacuum | FIG. 1 | 21.0 | 59 | 5 | 7 |
| Comparative Example | 10 | Ti—0.15 Ir | ○ | — | FIG. 2 | 47.6 | 95 | 28 | 37 |
| Inventive Example | 11 | Ti—0.15 Ir | ○ | Heating in vacuum | FIG. 1 | 17.8 | 70 | 6 | 7 |
| Comparative Example | 12 | Ti—0.15 Rh | ○ | — | FIG. 2 | 52.3 | 100 | 38 | 50 |
| Inventive Example | 13 | Ti—0.15 Rh | ○ | Heating in vacuum | FIG. 1 | 20.8 | 78 | 7 | 9 |
| Comparative Example | 14 | Ti—0.15 Au | ○ | Heating in air | FIG. 3 | 45.5 | 110 | 236 | 280 |
| Inventive Example | 15 | Ti—0.15 Au | ○ | Heating in vacuum | FIG. 1 | 17.6 | 85 | 6 | 8 |
| Comparative Example | 16 | Ti—0.15 Ag | ○ | Heating in air | FIG. 3 | 39.7 | 120 | 320 | 340 |

TABLE 1-continued

| Category | Abbreviation | Titanium alloy substrate | Formation of the mixture layer | | Mixture layer | | | Contact resistance | |
| | | | Acid solution treatment | Hot atmosphere treatment | Structure | Average content of the noble metal element (atomic %) | Average thickness (nm) | Before the corrosion resistance | After the corrosion resistance |
|---|---|---|---|---|---|---|---|---|---|
| Inventive Example | 17 | Ti—0.15 Ag | ○ | Heating in vacuum | FIG. 1 | 20.1 | 88 | 7 | 9 |
| Comparative Example | 18 | Ti—0.15 Pd—0.15 Ru | ○ | — | FIG. 2 | 70.8 | 105 | 23 | 31 |
| Inventive Example | 19 | Ti—0.15 Pd—0.15 Ru | ○ | Heating in vacuum | FIG. 1 | 35.4 | 79 | 5 | 6 |
| Comparative Example | 20 | Ti—0.15 Pd—0.15 Ir | ○ | — | FIG. 2 | 74.5 | 92 | 24 | 30 |
| Inventive Example | 21 | Ti—0.15 Pd—0.15 Ir | ○ | Heating in vacuum | FIG. 1 | 33.4 | 70 | 5 | 7 |
| Comparative Example | 22 | Ti—0.15 Pd—0.15 Au | ○ | — | FIG. 2 | 68.8 | 90 | 27 | 31 |
| Inventive Example | 23 | Ti—0.15 Pd—0.15 Au | ○ | Heating in vacuum | FIG. 1 | 32.2 | 69 | 6 | 8 |
| Comparative Example | 24 | Ti—0.15 Pd—0.15 Ag | ○ | — | FIG. 2 | 77.2 | 98 | 39 | 43 |
| Inventive Example | 25 | Ti—0.15 Pd—0.15 Ag | ○ | Heating in vacuum | FIG. 1 | 36.9 | 72 | 6 | 9 |

EXAMPLE 2

After precipitating Pd to the surface of the Ti-0.15 Pd titanium alloy plate, a mixture layer of the noble metal element (Pd) and the titanium oxide was formed on the surface of the titanium alloy plate by changing temperature of the heat treatment under vacuum as shown in Table 2. Contact resistance of this titanium alloy plate was measured to evaluate durability as the titanium material for an electrode.

More specifically, the Ti-0.15 Pd titanium alloy plate which had been prepared to the same size as that of Example 1 was pretreated as in the case of Example 1 except that immersion in the aqueous acid solution containing nitric acid and hydrogen fluoride was conducted for 30 minutes. Next, the titanium alloy plate having the Pd precipitated to the surface by the immersion in the aqueous acid solution was heat treated in vacuum to form a mixture layer of the titanium oxide and the Pd on the surface of the titanium alloy plate. This plate was used for the test sample. The heat treatment in vacuum was conducted in the furnace having a common oxygen partial pressure of $10^{-5}$ Torr with the heat treatment temperature varied in the range of 200 to 850° C. as shown in Table 2. The heat treatment was conducted for 30 minutes in all cases.

The test sample was evaluated for its contact resistance by repeating the procedure of Example 1. Also, the mixture layer was evaluated for the durability by repeating Example 1 by conducting the corrosion test simulating the use as a fuel cell separator and thereafter measuring the contact resistance, and comparing the results before and after the corrosion test for evaluation of the durability.

The structure, thickness, and content of the Pd element of the layer comprising a mixture of the Pd (crystals or grains) and the titanium oxide was also evaluated by the structural analysis and analysis conducted by repeating the procedure of Example 1. The results are shown in Table 2.

As shown in Table 2, in Inventive Examples 28 to 33, the noble metal element has been precipitated to the surface of the titanium alloy plate by the immersion in the preferable aqueous acid solution as described above, and the layer of the mixture of the Pd and the titanium oxide of the type the same as the one formed in Inventive Example 4 (Table 1) as shown in FIG. 1 was formed on the surface of the titanium alloy plate by the heat treatment in vacuum at the preferable temperature in the range of 350 to 800° C.

As a consequence, in the Inventive Examples 28 to 33, the surface of the mixture layer and the titanium alloy substrate had an electroconductivity as measured by the contact resistance of up to 12 mΩ·cm² when measured by the procedure as described above. In addition, the electroconductivity after the corrosion test as measured by the contact resistance was also up to 12 mΩ·cm² when measured by the procedure as described above. Accordingly, Inventive Examples 28 to 33 can be deemed a material having extremely high resistance properties in view of the low contact resistance, and the low value which is maintained even after the corrosion test.

In contrast, in Comparative Examples 26 and 27 of Table 2, temperature in the heat treatment under vacuum was too low, and compaction of the mixture layer and oxygen diffusion to the mixture layer was insufficient, a layer of the mixture of the noble metal element and the titanium oxide which was the same type as the one formed in the Comparative Example 2 (Table 1) shown in FIG. 2 was formed on the surface of the titanium alloy substrate. On the other hand, in Comparative Example 34, the temperature in the heat treatment under vacuum was too high, and the growth of the titanium oxide was promoted, and a layer of the mixture of the noble metal element and the titanium oxide which was the same type as the one formed in the Comparative Example 3 (Table 1) shown in FIG. 3 was formed on the surface of the titanium alloy substrate.

As a consequence, in the Comparative Examples, either the contact resistance of the surface of the mixture layer and the titanium alloy substrate or the contact resistance after the corrosion resistance was in excess of 12 mΩ·cm². Accordingly, all of the Comparative Examples had significantly inferior contact resistance properties as demonstrated by the high contact resistance as well as the increased contact resistance after the corrosion test.

TABLE 2

| | | | | Heat treatment under vacuum | | | | Mixture layer | | Contact resistance (mΩ·cm²) | |
|---|---|---|---|---|---|---|---|---|---|---|---|
| Category | Abbreviation | Titanium alloy substrate | Acid solution treatment | Degree of vacuum in the furnace (Torr) | Temperature (° C.) | Time (Minute) | Structure | Average Pd content (atomic %) | Average thickness (nm) | Before the corrosion resistance | After the corrosion resistance |
| Comparative Example | 26 | Ti—0.15 Pd | ◯ | 1 × 10⁻⁵ | 200 | 30 | FIG. 2 | 28.3 | 88 | 27 | 245 |
| Comparative Example | 27 | Ti—0.15 Pd | ◯ | 1 × 10⁻⁵ | 300 | 30 | FIG. 2 | 25.6 | 80 | 12 | 96 |
| Inventive Example | 28 | Ti—0.15 Pd | ◯ | 1 × 10⁻⁵ | 350 | 30 | FIG. 1 | 22.1 | 77 | 9 | 11 |
| Inventive Example | 29 | Ti—0.15 Pd | ◯ | 1 × 10⁻⁵ | 400 | 30 | FIG. 1 | 21.9 | 68 | 6 | 9 |
| Inventive Example | 30 | Ti—0.15 Pd | ◯ | 1 × 10⁻⁵ | 500 | 30 | FIG. 1 | 20.5 | 72 | 5 | 5 |
| Inventive Example | 31 | Ti—0.15 Pd | ◯ | 1 × 10⁻⁵ | 600 | 30 | FIG. 1 | 22.2 | 75 | 5 | 5 |
| Inventive Example | 32 | Ti—0.15 Pd | ◯ | 1 × 10⁻⁵ | 700 | 30 | FIG. 1 | 24.4 | 80 | 7 | 10 |
| Inventive Example | 33 | Ti—0.15 Pd | ◯ | 1 × 10⁻⁵ | 800 | 30 | FIG. 1 | 29.0 | 79 | 10 | 12 |
| Comparative Example | 34 | Ti—0.15 Pd | ◯ | 1 × 10⁻⁵ | 850 | 30 | FIG. 3 | 37.4 | 85 | 50 | 72 |

EXAMPLE 3

After precipitating Pd at the surface of the Ti-0.15 Pd titanium alloy plate, a mixture layer of the Pd and the titanium oxide was formed on the surface of the titanium alloy plate by changing degree of the vacuum in the furnace in the heat treatment under vacuum as shown in Table 3. Contact resistance of this titanium alloy plate was measured to evaluate durability as the titanium material for an electrode.

More specifically, the Ti-0.15 Pd titanium alloy plate which had been prepared to the same size as that of Example 1 was pretreated as in the case of Example 2. Next, the titanium alloy plate having the Pd precipitated to the surface by the immersion in the aqueous acid solution was heat treated in vacuum.

The heat treatment in vacuum was conducted by reducing the pressure of the interior of the heat treatment furnace to the oxygen partial pressure in the order of 10⁻⁴ Torr, and introducing a minute amount of nitrogen gas or argon gas in the furnace to change the degree of vacuum in the furnace to 0.1 Torr, 10 Torr, and 760 Torr (atmospheric pressure) as shown in Table 3. In the Comparative Examples, the degree of vacuum in the furnace was changed to 0.1 Torr and 100 Torr, respectively with the air introduced in the interior of the furnace without introducing nitrogen gas or argon gas. The heat treatment was conducted in such degree of vacuum at 500° C. for 30 minutes, and the mixture layer of the titanium oxide and the Pd was formed on the surface of the titanium alloy plate to provide the test sample.

The test sample was evaluated for its contact resistance by repeating the procedure of Example 1. Also, the mixture layer was evaluated for the durability by repeating Example 1 by conducting the corrosion test simulating the use as a fuel cell separator and thereafter measuring the contact resistance, and comparing the results before and after the corrosion test for evaluation of the durability.

The structure, thickness, and content of the Pd element of the layer comprising a mixture of the Pd (crystals or grains) and the titanium oxide was also evaluated by the structural analysis and analysis conducted by repeating the procedure of Example 1. The results are shown in Table 2.

As shown in Table 3, in the Inventive Examples 35 to 40, nitrogen gas or argon gas is introduced in the furnace, and the interior of the furnace is maintained at a low oxygen partial pressure. Accordingly, the layer of the mixture of the Pd and the titanium oxide of the type the same as the one formed in Inventive Example 4 (Table 1) as shown in FIG. 1 was formed on the surface of the titanium alloy plate not to mention in the Inventive Examples 35, 36, 38, and 39 conducted at a relatively low degree of vacuum in the furnace but also in the Inventive Examples 37 and 40 where the degree of vacuum in the furnace is substantially the same as that of the atmospheric pressure.

As a consequence, in the Inventive Examples 35 to 40, the surface of the mixture layer and the titanium alloy substrate had an electroconductivity as measured by the contact resistance of up to 12 mΩ·cm² when measured by the procedure as described above. In addition, the electroconductivity after the corrosion test as measured by the contact resistance was also up to 12 mΩ·cm² when measured by the procedure as described above. Accordingly, Inventive Examples 35 to 40 can be deemed a material having extremely high resistance properties in view of the low contact resistance, and the low value which is maintained even after the corrosion test.

In contrast, in Comparative Examples 41 and 42 of Table 3, a layer of the mixture of the Pd and the titanium oxide which was the same type as the one formed in the Comparative Example 3 (Table 1) shown in FIG. 3 was formed on the surface of the titanium alloy substrate irrespective of the degree of vacuum in the furnace and despite use of a pressure lower than atmospheric pressure, because of the high oxygen partial pressure in the furnace.

As a consequence, in all of the Comparative Examples, contact resistance of the surface of the mixture layer and the titanium alloy substrate and the contact resistance after the corrosion test were in excess of 12 mΩ·cm². Accordingly, all of the Comparative Examples had significantly inferior contact resistance properties as demonstrated by the high contact resistance as well as the increased contact resistance after the corrosion test.

Comparison within the Inventive Examples or within the Comparative Examples in Table 3 reveals that, when nitrogen gas or argon gas is introduced in the furnace, excellent contact resistance properties are realized even at a low degree of vacuum in the furnace. However, even in such a case, better contact resistance properties are realized at a higher degree of vacuum (i.e. at a lower pressure).

TABLE 3

| | | | Formation of the mixture layer | | | | | | |
|---|---|---|---|---|---|---|---|---|---|
| | | | | Heat treatment under vacuum | | Mixture layer | | Contact resistance $(m\Omega \cdot cm^2)$ | |
| Category | Abbreviation | Titanium alloy substrate | Acid solution treatment | Degree of vacuum in the furnace (Torr) | Gas introduced in the furnace | Structure | Average Pd content (atomic %) | Average thickness (nm) | Before the corrosion resistance | After the corrosion resistance |
| Inventive Example | 35 | Ti—0.15 Pd | ○ | 0.1 | Nitrogen | FIG. 1 | 21.0 | 66 | 4 | 5 |
| Inventive Example | 36 | Ti—0.15 Pd | ○ | 10 | Nitrogen | FIG. 1 | 24.2 | 70 | 7 | 7 |
| Inventive Example | 37 | Ti—0.15 Pd | ○ | 760 | Nitrogen | FIG. 1 | 22.5 | 72 | 9 | 11 |
| Inventive Example | 38 | Ti—0.15 Pd | ○ | 0.1 | Argon | FIG. 1 | 25.6 | 68 | 6 | 5 |
| Inventive Example | 39 | Ti—0.15 Pd | ○ | 10 | Argon | FIG. 1 | 24.1 | 70 | 8 | 9 |
| Inventive Example | 40 | Ti—0.15 Pd | ○ | 760 | Argon | FIG. 1 | 25.5 | 70 | 10 | 12 |
| Comparative Example | 41 | Ti—0.15 Pd | ○ | 0.1 | Air | FIG. 3 | 38.2 | 79 | 78 | 85 |
| Comparative Example | 42 | Ti—0.15 Pd | ○ | 100 | Air | FIG. 3 | 40.5 | 82 | 7500 | 7850 |

INDUSTRIAL APPLICABILITY

The titanium material for an electrode produced by the method for producing the titanium material for an electrode of the present invention has a low initial contact resistance and an excellent durability due to the high corrosion resistance, and therefore, the high electroconductivity will be maintained for a long time with reduced risk of experiencing increase in the contact resistance. Accordingly, this titanium material is highly adapted for use in the electrode where such properties are required, and in particular, such titanium material is well adapted for use as a fuel cell separator, and when used for a fuel cell separator, the high electroconductivity will be maintained for a long time with reduced risk of experiencing increase in the contact resistance.

The invention claimed is:

1. A separator for a fuel cell comprising a titanium material, the titanium material comprising:
   a titanium alloy substrate comprising at least one noble metal element selected from the group consisting of platinum group elements, Au and Ag; and
   a layer of a mixture formed on a surface of the titanium alloy substrate, the mixture comprising a noble metal element precipitated from the titanium alloy substrate and a titanium oxide formed from the titanium alloy substrate, and said layer having an average thickness of up to 200 nm;
   wherein:
   the mixture layer on the surface and the titanium alloy substrate have a conductivity in terms of contact resistance of up to 10 $m\Omega \cdot cm^2$; and
   contact resistance is determined by:
   placing a carbon cloth having an average thickness of 0.3 mm on opposite surfaces of a sample of the titanium alloy substrate having the mixture layer formed thereon;
   sandwiching the sample of the titanium alloy material with a pair of copper electrodes via the carbon cloth, the copper electrodes each having a contact area with the titanium alloy material of 1 $cm^2$; and
   measuring a voltage drop between the carbon cloths by using a four terminal ohmmeter while pressing the copper electrodes against the sample of the titanium alloy material at a surface pressure of 5 $kg/cm^2$ by using a hydraulic press and applying an electric current of 7.4 mA between the copper electrodes.

2. The separator according to claim 1, wherein the layer of the mixture of the noble metal element and the titanium oxide is a layer of a mixture of the noble metal element precipitated from the titanium alloy substrate and the titanium oxide generated by heat treatment of the titanium alloy substrate after the precipitation of the noble metal.

3. The separator according to claim 2, wherein:
   the precipitation of the noble metal element from the titanium alloy substrate is accomplished by treating the titanium alloy substrate with an acid solution comprising an acid which does not oxidize the titanium alloy and an acid which oxidizes the titanium alloy; and
   the formation of the titanium oxide is accomplished by heat treating the titanium alloy substrate after the precipitation of the noble metal in an atmosphere having a low oxygen concentration at an oxygen partial pressure $10^{-2}$ Torr or less and a temperature of 350 to 800° C.

4. The separator according to claim 1, wherein the titanium alloy substrate comprises the noble metal element at a total content of 0.005 to 1.0% by mass.

5. The separator according to claim 2, wherein the titanium alloy substrate comprises the noble metal element at a total content of 0.005 to 1.0% by mass.

6. The separator according to claim 3, wherein the titanium alloy substrate comprises the noble metal element at a total content of 0.005 to 1.0% by mass.

7. The separator according to claim 1, wherein an average total content of the noble metal element in the mixture layer is 1 to 90 atomic % based on 100 atomic % of Ti and the noble element.

8. The separator according to claim 2, wherein an average total content of the noble metal element in the mixture layer is 1 to 90 atomic % based on 100 atomic % of Ti and the noble element.

9. The separator according to claim 3, wherein an average total content of the noble metal element in the mixture layer is 1 to 90 atomic % based on 100 atomic % of Ti and the noble element.

10. The separator according to claim 4, wherein an average total content of the noble metal element in the mixture layer is 1 to 90 atomic % based on 100 atomic % of Ti and the noble element.

11. The separator according to claim 5, wherein an average total content of the noble metal element in the mixture layer is 1 to 90 atomic % based on 100 atomic % of Ti and the noble element.

12. The separator according to claim 6, wherein an average total content of the noble metal element in the mixture layer is 1 to 90 atomic % based on 100 atomic % of Ti and the noble element.

13. The separator according to claim 1, wherein the mixture layer has an average thickness of 10 to 100 nm.

14. The separator according to claim 2, wherein the mixture layer has an average thickness of 10 to 100 nm.

15. The separator according to claim 3, wherein the mixture layer has an average thickness of 10 to 100 nm.

16. The separator according to claim 4, wherein the mixture layer has an average thickness of 10 to 100 nm.

17. The separator according to claim 5, wherein the mixture layer has an average thickness of 10 to 100 nm.

18. The separator according to claim 6, wherein the mixture layer has an average thickness of 10 to 100 nm.

19. The separator according to claim 7, wherein the mixture layer has an average thickness of 10 to 100 nm.

20. The separator according to claim 8, wherein the mixture layer has an average thickness of 10 to 100 nm.

21. The separator according to claim 9, wherein the mixture layer has an average thickness of 10 to 100 nm.

22. The separator according to claim 10, wherein the mixture layer has an average thickness of 10 to 100 nm.

23. The separator according to claim 11, wherein the mixture layer has an average thickness of 10 to 100 nm.

24. The separator according to claim 12, wherein the mixture layer has an average thickness of 10 to 100 nm.

\* \* \* \* \*